(12) United States Patent
Gielda et al.

(10) Patent No.: US 8,926,003 B2
(45) Date of Patent: Jan. 6, 2015

(54) CAB FRAME WITH HYDROFORMED ROLLOVER PROTECTIVE STRUCTURE

(71) Applicant: Caterpillar Inc., Peoria, IL (US)

(72) Inventors: Matthew J. Gielda, Peoria, IL (US);
Christian D. Ritchie, Morton, IL (US);
Brent Ryan Frazier, Morton, IL (US);
Justin Michael Malohn, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/761,777

(22) Filed: Feb. 7, 2013

(65) Prior Publication Data

US 2014/0217778 A1   Aug. 7, 2014

(51) Int. Cl.
*B60R 21/13*   (2006.01)
*B62D 33/06*   (2006.01)

(52) U.S. Cl.
CPC .......... *B60R 21/13* (2013.01); *B62D 33/0617* (2013.01)
USPC ..................... 296/190.03; 280/756

(58) Field of Classification Search
CPC .............................. B60R 21/13; B60R 21/131
USPC ............... 296/190.03, 102, 187.13, 190.08; 280/756; 180/89.12
See application file for complete search history.

(56) References Cited

U.S. PATENT DOCUMENTS

| | | | |
|---|---|---|---|
| 4,412,595 A | 11/1983 | Kinzel | |
| 4,600,236 A * | 7/1986 | Weiss et al. | 296/190.03 |
| 5,213,386 A * | 5/1993 | Janotik et al. | 296/29 |
| 5,273,340 A | 12/1993 | Nelson et al. | |
| D348,030 S | 6/1994 | Heathcote | |
| 5,636,867 A * | 6/1997 | McNabb et al. | 280/756 |
| 6,189,955 B1 * | 2/2001 | Fryk et al. | 296/190.08 |
| 6,199,932 B1 | 3/2001 | Welsh et al. | |
| 6,279,978 B1 * | 8/2001 | Schreyer et al. | 296/39.3 |

(Continued)

FOREIGN PATENT DOCUMENTS

| | | |
|---|---|---|
| DE | 19602797 A1 | 7/1997 |
| GB | 1170240 A | 11/1969 |
| JP | 2001097155 A | 4/2001 |

OTHER PUBLICATIONS

Gielda, M.J., Ritchie, C.D., Frazier, B.R., Malohn, J.M., and Van De Veer, B.R., Cab Frame with Integrated Rollover Portective Structure. U.S. Nonprovisional Patent Application, filed Feb. 7, 2013, 35 pages.

(Continued)

*Primary Examiner* — Gregory Blankenship
(74) *Attorney, Agent, or Firm* — Finnegan, Henderson, Farabow, Garrett & Dunner LLP

(57) ABSTRACT

A cab of a mobile machine may include a seat for an operator. The cab may also include a first vertical plane centrally located on the seat and extending along a length of the cab. The cab may further include a rollover protective structure (ROPS). The ROPS may include a first component and a second component positioned on either side of the first vertical plane. At least one of the first component and the second component may include a single tube shaped to form a C-post positioned behind the seat, a B-post positioned in front of the seat, and a header connecting the C-post and the B-post. The C-post and the B-post may each include support structures that extend from a floor of the cab to a roof of the cab. The header may extend along a length of the cab.

16 Claims, 9 Drawing Sheets

(56) References Cited

U.S. PATENT DOCUMENTS

| | | | |
|---|---|---|---|
| 6,282,790 B1* | 9/2001 | Jaekel et al. | 29/897.2 |
| 6,409,254 B2* | 6/2002 | Tiziano | 296/190.08 |
| 6,485,084 B2* | 11/2002 | Sorensen et al. | 296/102 |
| 6,824,204 B2* | 11/2004 | Gabbianelli et al. | 296/205 |
| 6,948,768 B2 | 9/2005 | Corcoran et al. | |
| 7,213,871 B2* | 5/2007 | Yamamoto | 296/190.03 |
| 7,243,982 B2* | 7/2007 | Kelley et al. | 296/190.08 |
| 7,261,321 B2* | 8/2007 | Della Valle | 280/756 |
| 7,654,569 B2 | 2/2010 | Nelson | |
| 7,677,646 B2* | 3/2010 | Nakamura | 296/190.08 |
| 8,052,202 B2* | 11/2011 | Nakamura | 296/190.08 |
| 8,079,636 B2* | 12/2011 | Namura et al. | 296/190.08 |
| 8,579,363 B2* | 11/2013 | Davis et al. | 296/190.03 |
| 2001/0050495 A1 | 12/2001 | Sorensen et al. | |
| 2005/0156422 A1 | 7/2005 | Della Valle | |
| 2012/0161474 A1* | 6/2012 | Gerke et al. | 296/190.03 |

OTHER PUBLICATIONS

Gielda, M.J., Ritchie, C.D., Malohn, J.M., and Frazier, B.R., Cab Rollover Protective Structure for Enhanced Visibility. U.S. Nonprovisional Patent Application, filed Feb. 7, 2013, 35 pages.

* cited by examiner

CAB FRAME WITH HYDROFORMED ROLLOVER PROTECTIVE STRUCTURE

TECHNICAL FIELD

The disclosure is related to a cab having a frame with a hydroformed rollover protective structure, and more particularly to a cab of a mobile machine having a frame with a hydroformed rollover protective structure.

BACKGROUND

A mobile machine, such as an earthmoving machine, an excavation-type machine, a mining machine, or the like, may be driven, or otherwise operated, by a person who sits in a cabin or cab connected to the machine. Often, the frame of the cab includes a rollover protective structure (ROPS). As its name describes, the purpose of the ROPS is to provide a structure that may prevent the cab from being crushed in a rollover. Often times, the ROPS is constructed from numerous hollow metal tubes of different lengths and cross-sectional dimensions. These tubes are welded together in different orientations to produce the desired shape of the cab frame. Welding the tubes together is a time-consuming, labor-intensive, and expensive process. The welds may also compromise the strength of the ROPS. Therefore, gussets are often used to strengthen the weld joints that are formed between vertically and horizontally extending tubes of the ROPS. Welding the gussets to the metal tubes is also time-consuming, labor-intensive, and expensive. Further, the gussets block access to the corners of the cab frame, where it would otherwise be convenient to run electrical harnesses and ducting.

British Patent GB 1170240 describes a tractor comprising arched tubular members that form a cage-like frame around an operator cabin. In GB '240, the cabin is suspended from, and positioned within, the frame to protect the cabin. While the frame of GB '240 may provide protection to the cabin in some applications, it may have disadvantages. For instance, the configuration of the frame may reduce the size of the cabin and reduce operator visibility from within the cabin. The disclosed cab frame is directed at overcoming these and or other drawbacks of existing rollover protective systems.

SUMMARY

In one aspect, a cab of a mobile machine is disclosed. The cab may include a seat for an operator. The cab may also include a first vertical plane centrally located on the seat and extending along a length of the cab. The cab may further include a rollover protective structure (ROPS). The ROPS may include a first component and a second component positioned on either side of the first vertical plane. At least one of the first component and the second component may include a single tube shaped to form a C-post positioned behind the seat, a B-post positioned in front of the seat, and a header connecting the C-post and the B-post. The C-post and the B-post may each include support structures that extend from a floor of the cab to a roof of the cab. The header may extend along a length of the cab.

In another aspect, a method of forming a frame for a cab of a mobile machine is disclosed. The method may include providing a seat for an operator. The seat may include a first vertical plane centrally located on the seat and extending along a length of the cab. The method may also include forming a first component and a second component by hydroforming. At least one of the first component and the second component may include a C-post and a B-post formed as a single part. The method may also include positioning the first component and second component on either side of the first vertical plane to form a rollover protective structure (ROPS). The first component and the second component may be positioned such that the C-post is located behind the seat and the B-post located in front of the seat. The C-post and the B-post may both include support structures that extend from a floor of the cab to a roof of the cab.

In yet another aspect, a cab for a mobile machine is disclosed. The cab may include a first vertical plane extending along a length of the cab, a second vertical plane orthogonal to the first vertical plane and extending along a width of the cab, and a third horizontal plane orthogonal to the first and second vertical planes. The cab may also include a rollover protective structure (ROPS). The ROPS may include a first component extending along the length of the cab and positioned at a side of the cab and a second component extending along the length of the cab and positioned at an opposite side of the cab. At least one of the first component and the second component may include a single tube shaped to form a C-post positioned at a rear portion of the cab and a B-post positioned at a mid-portion of the cab. The C-post and the B-post may both include support structures that extend from a floor of the cab to a roof of the cab. The support structure of the B-post may include an elongate member that is inclined with respect to the first and second vertical planes.

DETAILED DESCRIPTION

Figure 1:
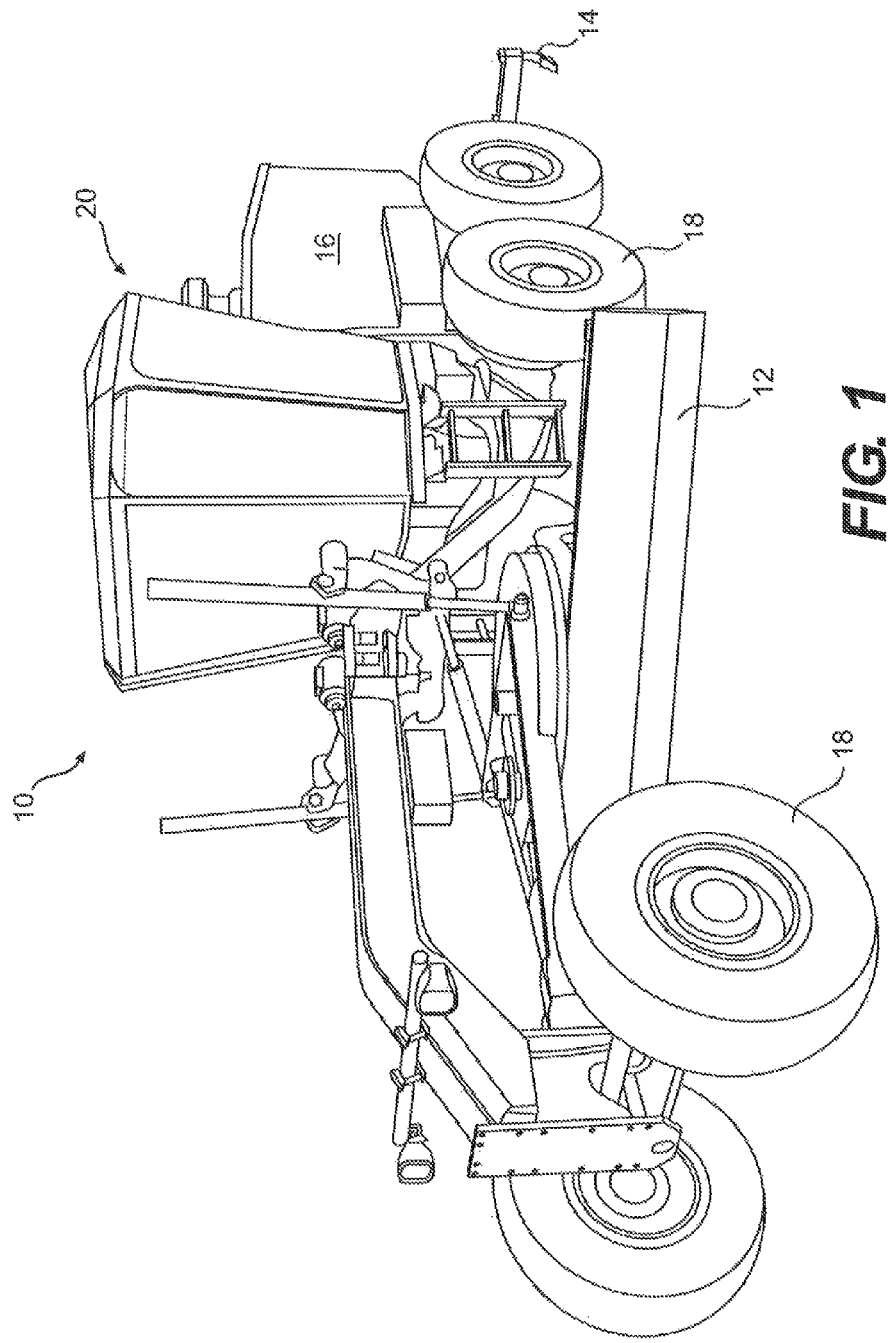
FIG. 1 is an exemplary mobile machine having a cab in accordance with the disclosure.

FIG. 1 illustrates an exemplary machine 10 having multiple systems and components that perform desired tasks at a work site. In the depicted example, machine 10 is a motor grader. It is contemplated, however, that machine 10 could alternatively embody another type of mobile machine, such as a backhoe, a front shovel, a dozer, or another similar machine. Machine 10 is powered by an engine system 16 and includes several wheels (with tires 18) that transport the machine to different locations. Machine 10 also includes, among other components, one or more ground engaging tools (GETs), for example, blade 12, ripper 14, etc., that perform desired tasks at the worksite. Blade 12 may be coupled to machine 10 by linkage and cylinder assemblies that may be independently controlled to move (rotate, translate, etc.) the blade 12 to a variety of different positions relative to machine 10. In some of these positions, the heel (bottom edge) of blade 12 may contact the tires 18 or other components of machine 10 and cause damage. Machine 10 may be driven, and its tools controlled, by an operator positioned in a cab 20. Typically, the operator controls and closely monitors the movement of the blade 12 (and other GETs) to prevent contact of the blade 12 with components of the machine 10.

Figure 2:
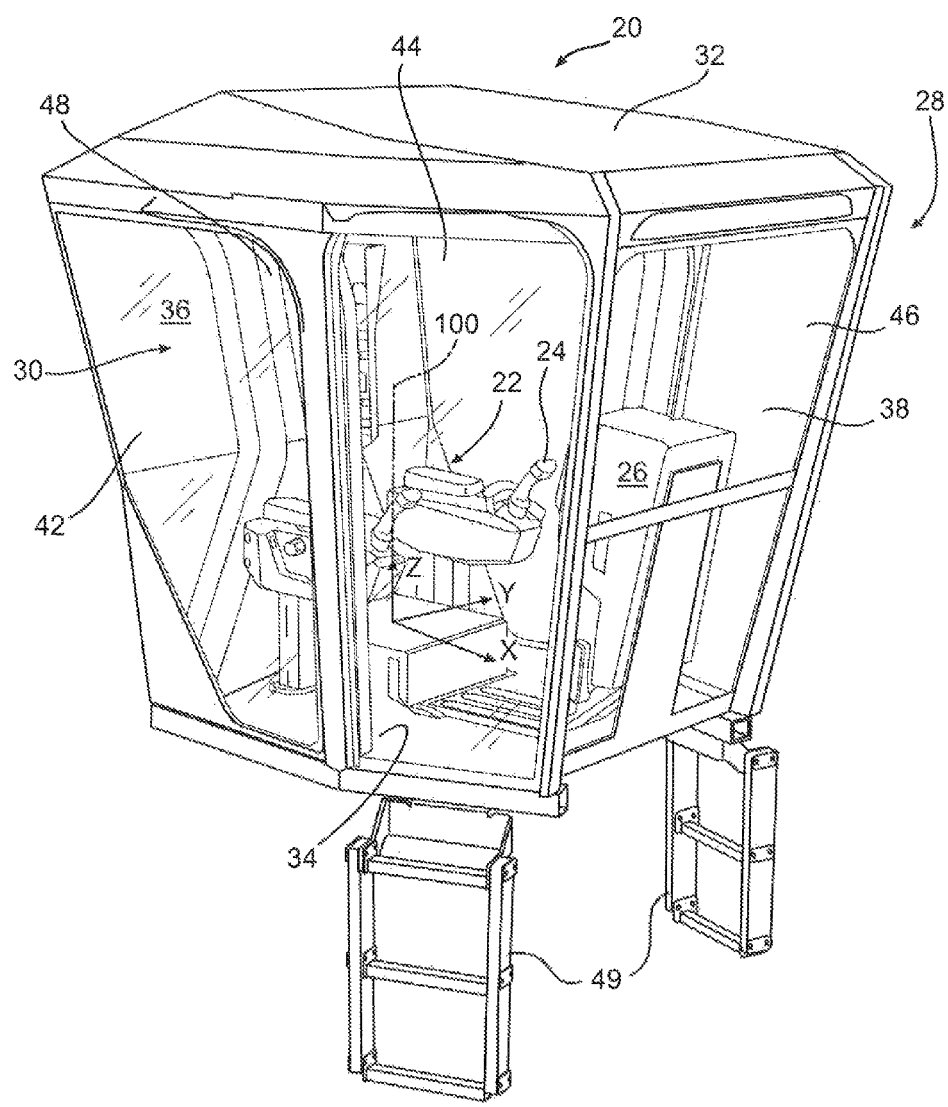
FIG. 2 is an isometric view of an exemplary cab of the current disclosure.

FIG. 2 is an isometric view of cab 20 separated from machine 10. Cab 20 may include a seat 22 for the operator to sit on while operating machine 10. Cab 20 may also house control devices (joysticks 24, etc.) and other instruments (e.g., console 26, communication systems, etc.) that enable the operator to drive and operate the GETs of machine 10. Typically, these control devices are positioned within easy reach and sight of the operator within the cab 20. Cab 20 includes an index axis 100. The index axis 100 is a vertical axis extending upward from a central location of the seat 22. The index axis 100 represents the general position of the operator's eyes, with varying height, when the operator is seated in seat 22. In general, the operator's view while seated on seat 22 will originate from the index axis 100. As will be described in more detail later, the operator's visibility, while operating machine 10, may generally be along straight lines that emanate from the index axis 100. These lines are referred to herein as lines of the sight of the operator. It is known that increasing operator visibility to critical zones of machine 10 (such as, for example, the heel of blade 12 and tires 18) reduces operator fatigue, increases productivity and improves machine efficiency.

Cab 20 includes a frame 28 that defines the shape of the cab 20. Cab 20 may have any shape and configuration. In general, the configuration of cab 20 may be adapted to increase the operator's visibility and comfort while providing the desired structural strength. To increase visibility, the components of the frame 28 may be arranged to minimize obstruction of the operator's line of sight to the GETs and its surroundings. To increase comfort, the components of the frame 28 may be adapted to increase the space available for the operator within the cab 20 without reducing the space needed for hydraulic and other systems of the machine 10.

Cab 20 includes a roof 32 and a floor 34 connected together by multiple walls to enclose a volume. These walls may include a back wall 36 facing the engine system 16, a front wall 38 facing the blade 12, and right and left sidewalls 42. In some embodiments, oblique walls 44 may connect the right and left sidewalls 42 to the front wall 38. Some or all of these walls may be made, or include portions, of glass or another transparent material. In some embodiments, as illustrated in FIG. 2, a substantial portion of the walls surrounding the cab 20 may be transparent. In some embodiments, as illustrated by back wall 36 of FIG. 2, a portion of the wall may include a skin of an opaque material and another portion of the wall may include glass.

The walls may be attached to the frame 28 or to each other to form the cab 20. The attachment regions may be sealed or caulked to reduce air leaks. A portion of the front wall 38 may serve as a windshield 46, and a portion of the back wall 36 may serve as a rear window 48. Cab 20 may also include one or more side windows and one or more doors. For instance, in some embodiments, one or both of the oblique walls 44 may include (or may be configured as) doors (not shown). These doors may provide access for the operator into the cab 20. In some embodiments, cab 20 may also include ladders or steps 49 to assist the operator in entering and exiting cab 20. To protect the operator in the case of a rollover of machine 10, cab 20 is provided with a ROPS 30. The ROPS 30 may be integrated with, or form portions of, the frame 28. In the case of a rollover, the ROPS 30 absorbs energy and prevents the cab 20 from being crushed due to the forces acting upon it.

Figure 3:
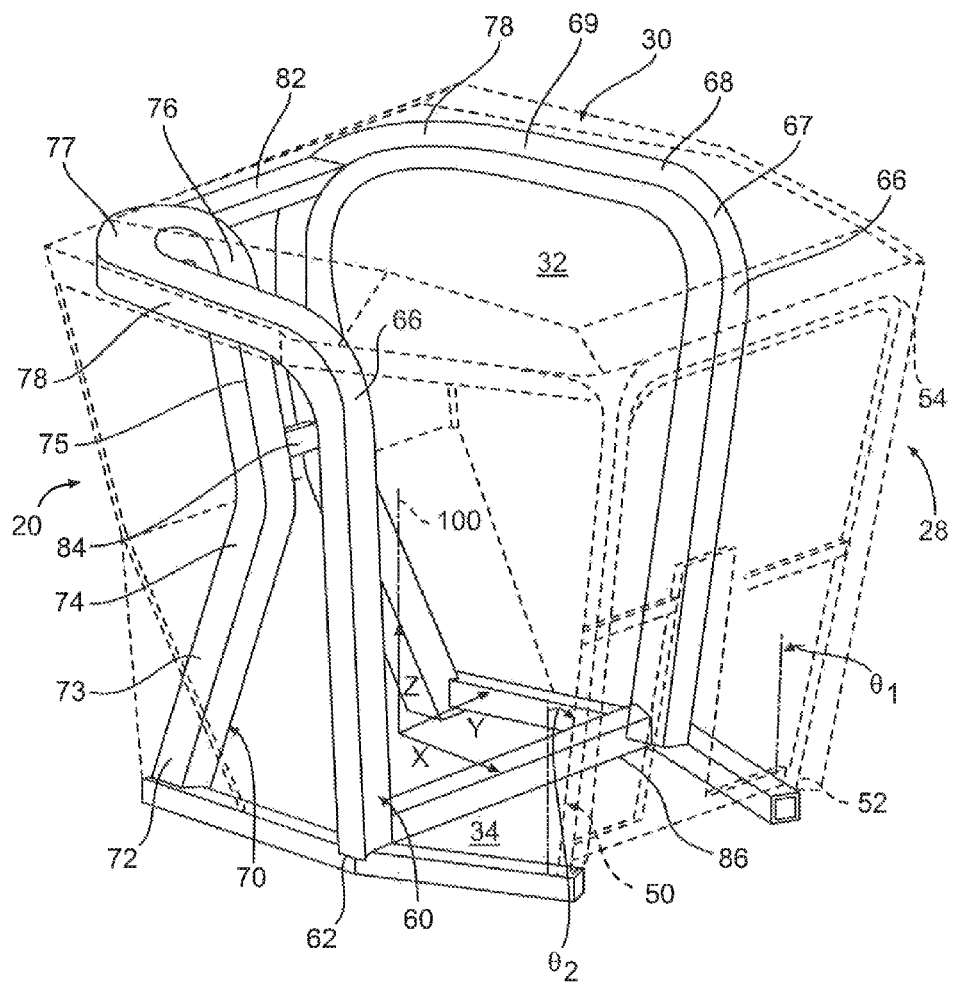
FIG. 3 is an isometric view of an exemplary frame that may be used in the cab of FIG. 2.

FIG. 3 is an isometric view of the frame 28 with the ROPS 30 integrated thereto. To illustrate the relative positions of the frame components within the cab 20, the body of the cab is shown in FIG. 3 using dashed lines. In the discussion below, the x-y-z triad illustrated in FIG. 3 will be used as the frame of reference, and where relevant, reference will be made to both FIGS. 2 and 3. In addition to other components, frame 28 includes two A-posts 50, two B-posts 60, and two C-posts 70 arranged along the length of the cab 20 (along the x-axis). As would be known to a person of ordinary skill in the art, A-posts, B-posts, and C-posts are vertically extending support members that are arranged from the front to the back of a cab. The A-posts 50, B-posts 60, and C-posts 70 are positioned at the front portion, mid portion, and rear portion, respectively, of the cab 20.

The A-posts 50 extends upwards from a first end 52 proximate the floor 34 to a second end 54 proximate the roof 32 of the cab 20. In some embodiments, the A-posts 50 extend linearly from the first end 52 to the second end 54. As illustrated in FIG. 3, in some embodiments, the A-posts 50 may be inclined in one or more orthogonal planes (for example, x-z plane and y-z plane). In some embodiments, the A-posts 50 may be inclined only along the x-z plane (that is, leaned or inclined forward from cab 20). In such embodiments, the magnitude of the x-coordinate of the second end 54 of each A-post 50 will be greater than the magnitude of the x-coordinate of its first end 52 (that is, $|x_{54}|>|x_{52}|$). In some embodiments, the A-posts 50 may be inclined along only the y-z plane (that is leaned or inclined outwards from cab 20). In such embodiments, the magnitude of the y-coordinate of the second end 54 may be greater than the magnitude of the y-coordinate of the first end 52 (that is, $|y_{54}|>y_{52}|$).

In some embodiments, the A-posts 50 may be inclined both forward and outward. That is, each A-post 50 may be inclined along both the x-z plane and the y-z plane (that is, $|x_{54}|>x_{52}|$ and $|y_{54}|>y_{52}|$). The A-posts 50 may be inclined forwardly in the x-z plane such each A-post 50 makes an angle $\theta_1$ with the y-z plane. And, the A-posts 50 may be inclined outwardly in the y-z plane such that each A-post 50 makes an angle $\theta_2$ with the x-z plane. In the inclined configuration (in the x-z plane, y-z plane, or in both), the first ends 52 (of the two A-posts 50) may be closer to each other than their second ends 54. In general, $\theta_1$ may vary between about 0°-25°, and $\theta_2$ may vary between about 0°-12°. In some embodiments, $\theta_1$ may vary between about 5°-25°, and $\theta_2$ may vary between about 2°-12°. In a preferred embodiment, $\theta_1$ may vary between about 7°-15°, and $\theta_2$ may vary between about 2°-8°. Throughout this disclosure, the term "about" is used to indicate that a disclosed dimension may vary by about 10% from the disclosed value due to measurement and other inaccuracies.

The front wall 38 and the windshield 46 of the cab 20 are positioned between the A-posts 50 (FIG. 2). Inclining the A-posts 50 forward and/or outward may have several benefits. For instance, such an inclination may increase the windshield area and enhance visibility through the windshield 46. Inclining the A-posts 50 forward and outward also makes the A-posts 50 appear to be vertical to an operator seated in seat 22. The shape and configuration of the A-posts 50 may be adapted to minimize visibility blockage, and allow unobstructed viewing to the front of machine 10. For instance, in some embodiments, the A-post 50 may have an elongated (for example, rectangular) cross-section with orthogonal long and short axes. To minimize obstruction to the operator's line of sight, the long axis of the A-posts 50 may be oriented to be parallel to the operator's line of sight. The spacing between the A-posts 50 may be optimized to accommodate the controls within the cab 20, and hydraulic systems below the cab.

The C-posts 70 are located at the rear end of the cab 20, and the B-posts 60 are located between the A-posts 50 and the C-posts 70. With reference to FIG. 2, in some embodiments, the C-posts 70 may be positioned behind the operator's seat 22, and the B-posts 60 may be located in front of the seat 22. The B-posts 60 and the C-posts 70 together comprise the ROPS 30 of cab 20. FIGS. 4, 5, 6, and 7 illustrate an isometric view, front view, side view, and top view respectively of ROPS 30. In the discussion that follows, reference will be made to FIGS. 4-7. The B-post 60 and C-post 70 of ROPS 30 may be formed as a connected single part by a hydroforming operation.

During the hydroforming operation, a hollow tube of a ROPS grade steel, having a constant circular cross-section, may be held in a mold and a pressurized fluid (i.e., liquid or gas) may be flowed through the interior of the tube. As a result, the hollow tube may be plastically deformed and may take on the shape of the mold. The mold may have the shape of the combined B-post 60 and C-post 70. Therefore, through a hydroforming operation, the hollow tube may be transformed into a single part (or piece) having the shape of a connected B-post 60 and C-post 70 in a single manufacturing step. The hydroforming operation allows a single straight tube of constant cross-section shape and size (diameter, wall thickness, etc.) to be transformed into a connected B-post 60 and C-post 70 with different cross-sectional shapes at different locations. For instance, in some embodiments, a hollow tube having a wall thickness of greater than 6 mm may be hydroformed to produce a part having different cross-sectional shapes and thicknesses at different locations of the C-post 70 and different cross-sectional shapes and thicknesses at different locations of the B-post 60. The shape of the hydroformed structure has a large effect on the way stress is distributed across and around a tube. Controlling the stress distribution enables the use of less material while increasing the frame strength. In general, thicker tubes may be used to form ROPS of larger machines that may require higher load carrying capacity, and thinner tubes may be used for smaller machines that may require lower load carrying capacity. Although not a limitation, in general, the thickness of the tubes may vary between 2 mm-12 mm. The configuration (shape, etc.) of the connected B-post 60 and C-post 70 disclosed in this application is such that the component may be repeatably manufactured by hydroforming tubes of any thickness, without defects.

Forming the B-post 60 and the C-post 70 by hydroforming as a single piece eliminates welds and other joints that may be otherwise needed to join a separate C-post 70 to the B-post 60. Eliminating welds and joints increases the strength and load carrying capacity of the resulting structure. Forming the B-post 60 and the C-post 70 jointly as a single piece also reduces the number of separate parts (tubes, gussets, etc.) and manufacturing operations needed to form a ROPS having the desired load carrying capacity. The cross-section and orientation of the structure at different locations may be adapted to improve operator visibility and accommodate component-mounting features. For instance, the orientation of the structure at different locations may be adapted to reduce obstruction to the operator's line of sight (for instance, a thin section of the structure at different locations may be arranged to face the operator). As discussed previously, increasing operator visibility increases operator and machine efficiency. In some embodiments, door-mounting features may be incorporated into the B-posts 60 to support doors on the oblique wall 44. Integrating components into the ROPS reduce parts and overall weight of the machine 10.

Two components, each comprising a B-post 60 and a C-post 70 formed jointly as a single piece, are formed by hydroforming. The two hydroformed components are then attached together by cross members 82, 84, 86 to form the ROPS 30. The cross members 82, 84, 86 may be attached to the B-post 60 and C-post 70 on either side by welding or by any suitable attachment method. Although the two hydroformed components (and their respective B-post 60 and C-post 70) described and illustrated in this disclosure are symmetric, this is not a requirement. In general, the hydroformed components on either side of the cab 20 may be non-symmetric and may include a different number of support structures. For instance, in some embodiments, the hydroformed component on one side of cab 20 may only include a B-post 60 while the component on the opposite side may include a B-post 60 and a C-post 70. Since the embodiment of the B-posts 60 and C-posts 70 on either side of the cab 20, described in this disclosure, are substantially identical, only one of these structures will be described in the description below.

C-post 70 includes a first portion 73 that extends upwards (see FIG. 6) from a first end 72 proximate the floor 34 to a second end 74 located between the floor 34 and the roof 32 of cab 20. It should be noted, that the term "end" as used in this disclosure does not necessarily refer to a terminal end of a member. Rather, it is used to refer to a region where one portion of a member ends and another portion begins. First portion 73 is inclined in the y-z plane (see FIG. 5) such that the first end 72 is located proximate a rear corner of the cab 20, and the second end 74 is located proximate a center of the cab 20. In this orientation, the second end 74 of the first portion 73 is located behind the operator's seat 22 (that is, covered by the operator's seat 22 when viewed along the x-axis, see FIG. 2) and the first end 72 is angled outwards towards a corner of the cab 20 (see FIG. 2). In some embodiments, an angle $\theta_3$ (see FIG. 5) between the first portion 73 and the horizontal plane (x-y plane) may be between about 35°-75°. In some embodiments, angle $\theta_3$ may be between about 50°-70°. In preferred embodiments, angle $\theta_3$ may be between about 60°-70°

C-post 70 may include a second portion 75 that extends upwards from the second end 74 to a third end 76 proximate the roof 32. The second portions 75 of the C-posts 70 on either side of ROPS 30 may be substantially parallel to each other (see FIG. 5). In some embodiments, the second portion 75 may be a straight section that is inclined backwards (away from the seat 22) in the x-z plane (see FIG. 6). In some embodiments, the second portion 75 may be inclined from a vertical y-z plane by an angle $\theta_4$ between about 5°-30°. In some embodiments, angle $\theta_4$ may be between about 5°-20°, and in some preferred embodiments, angle $\theta_4$ may be between about 10°-15°, Since the second portions 75 are positioned behind the operator, the inclination of the second portions 75 away from the seat 22 increases cab space and allow the operator to recline the seat back (not shown). The rear window 48 of the cab 20 is positioned between second portions 75 of the C-posts 70 (see FIG. 2). The incline of the second portions 75 may reduce glare on the rear window 48 and transmission of UV rays into the cab 20, and thus reduce HVAC (Heating Ventilation and Air Conditioning) load. Inclination of the second portion 75 also may reduce dust accumulation on the rear window 48. In some embodiments of frame 28, the first portion 73 of the C-posts 70 may also be inclined in the x-z plane.

Figure 7:
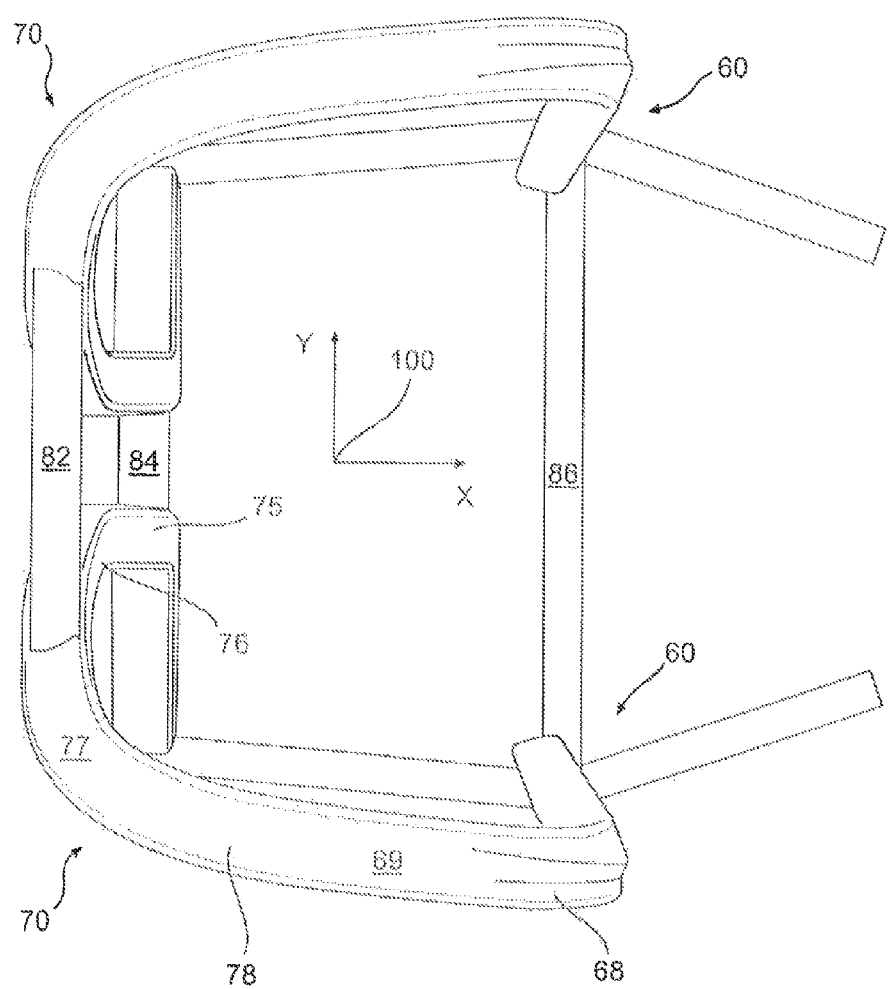
FIG. 7 is a top view of the ROPS of FIG. 4.

The C-post 70 includes a third portion 77 that curves out from the third end 76 to a fourth end 78 positioned proximate a side of the cab 20 (see FIG. 7). The third portion 77 curves along multiple orthogonal planes (for instance, y-z plane (see FIG. 5), and x-y plane (see FIG. 7)) to gradually change the orientation (direction of extension) of the C-post 70. That is, at the third end 76, the C-post 70 extends along the height (z-axis) of the cab 20, and at the fourth end 78, the C-post 70 extends along the length (x-axis) of the cab 20. In some embodiments, the curvature of the third portion 77 in both the y-z and the x-y planes changes constantly (referred to as, swept curvature) along its length to gradually change the direction of the C-post 70 from the third end 76 to the fourth end 78. The curved configuration of the third portion 77 may allow the ROPS 30 to readily absorb longitudinal forces. For example, with reference to FIG. 3, the curved third portion 77 may change the direction of a longitudinal force acting on the cab 20 in the −x direction (that is, from the front to back of the cab 20) first laterally towards the sides of the cab 20 (that is, in the y direction), and then downward (that is, in the −z direction) to the floor 34 of the cab 20. In some embodiments, the curvature of the third portion 77, in one or both of the y-z and x-y planes, may vary between about 1-4 times the diameter/width of the third portion 77. Such a curvature may assist manufacturability while allowing the ROPS 30 to absorb expected forces without creating locations of stress concentration.

A header 69 extends forwardly (in the x direction) from the fourth end 78 of the C-post 70 to a fifth end 68 along a side of the cab 20. The headers 69 on either side may support the roof 32 at the sides of the cab 20. In some embodiments, the headers 69 on either side of the cab 20 may be arranged such that they gradually diverge from each other from the fourth end 78 to the fifth end 68 (see FIG. 7). That is, the magnitude of the y-coordinate of the fifth end 68 may be greater than the magnitude of the y-coordinate of the fourth end 78 (that is, $|y_{68}|>y_{78}|$). In some embodiments, header 69 may extend linearly from the fourth end 78 to the fifth end 68, while in other embodiments, header 69 may be curved. The configuration (shape and arrangement) of the headers 69 on either side may increase the width of the top of cab 20 towards the front. This configuration may increase the size of the windshield 46, and the operator's visibility towards the front. A curved header 69 may increase the strength of the ROPS 30 by allowing multiple load paths through the header 69. A curved header 69 may also assist in smoothly transferring loads to the floor 34 of cab 20 without producing regions of stress concentration. A curved header 69 may also assist in reducing joints and added parts (for example, gussets), and thereby eliminate regions of structural weakness and reduce machine weight.

A fifth portion 67 connects the fifth end 68 of header 69 to a sixth end 66 of a B-post 60. The fifth portion 67 is curved in the x-z plane (see FIG. 6) and changes the orientation of the ROPS 30. That is, at the fifth end 68, header 69 extends along the length (x-axis) of the cab 20, and at the sixth end 66, the B-post 60 extends along the height (z-axis) of the cab 20. In some embodiments, the curvature of the fifth portion 67 may change constantly, while in other embodiments, the curvature may be fixed. In some embodiments, the curvature of the fifth portion 67 may vary between about 1-4 times the diameter/width of the fifth portion 67. Such a curvature may assist manufacturability while allowing the ROPS 30 to absorb expected forces without creating locations of stress concentration.

The B-post 60 of ROPS 30 extends from a seventh end 62 positioned proximate the floor 34 of cab 20 to the sixth end 66 of the fifth portion 67. In some embodiments, the B-posts 60 may extend linearly from the seventh end 62 to the sixth end 66. Similar to the A-posts 50, the B-posts 60 on either side of the cab 20 may be inclined forwardly and outwardly from the seventh end 62 to the sixth end 66. That is, the B-post 60 may be inclined in both the x-z plane (see FIG. 6) and the y-z plane (see FIG. 5). In general, the B-post 60 may be inclined forwardly in the x-z plane such the B-post 60 makes an angle $\theta_5$ between about 0°-10° from the y-z plane (see FIG. 6), and the B-post 60 may be inclined outwardly in the y-z plane such that the B-post 60 makes an angle $\theta_6$ between about 0°-15° from the x-z plane (see FIG. 5). In some embodiments, $\theta_5$ may be between about 2°-10°, and $\theta_6$ between about 5°-15°. In some preferred embodiments, $\theta_5$ may be between about 2°-6°, and $\theta_6$ between about 5°-10°. Due to their inclination, the seventh ends 62 of the B-posts 60 on either side may be closer to each other than the sixth ends 66. In some embodiments, the B-posts 60 may only be inclined in one plane (that is, only along one of y-z or x-z planes).

Inclining the B-posts 60 forward and outward makes these posts appear vertical to an operator in seat 22. Inclining the B-posts 60 forward and/or outward also increases the space inside the cab 20 and the area of the windshield 46. The oblique walls 44 (see FIG. 2) and the doors of cab 20 are positioned between the B-posts 60 and the A-posts 50. Inclining the B-posts 60 and the A-posts 50 forwardly and/or outwardly increases the available area for the door and thus makes entry (and exit) into cab 20 easier. The cross-sectional shape and configuration of the B-post 60 may also be adapted to minimize visibility blockage, and allow unobstructed viewing through the side and oblique walls 42, 44 of the cab 20. For instance, the B-posts 60 may have an elongated cross-sectional shape with a long and a short axis. And, the B-post 60 may be arranged such that its long axis is oriented to be parallel to the operator's line of sight.

Figure 4:
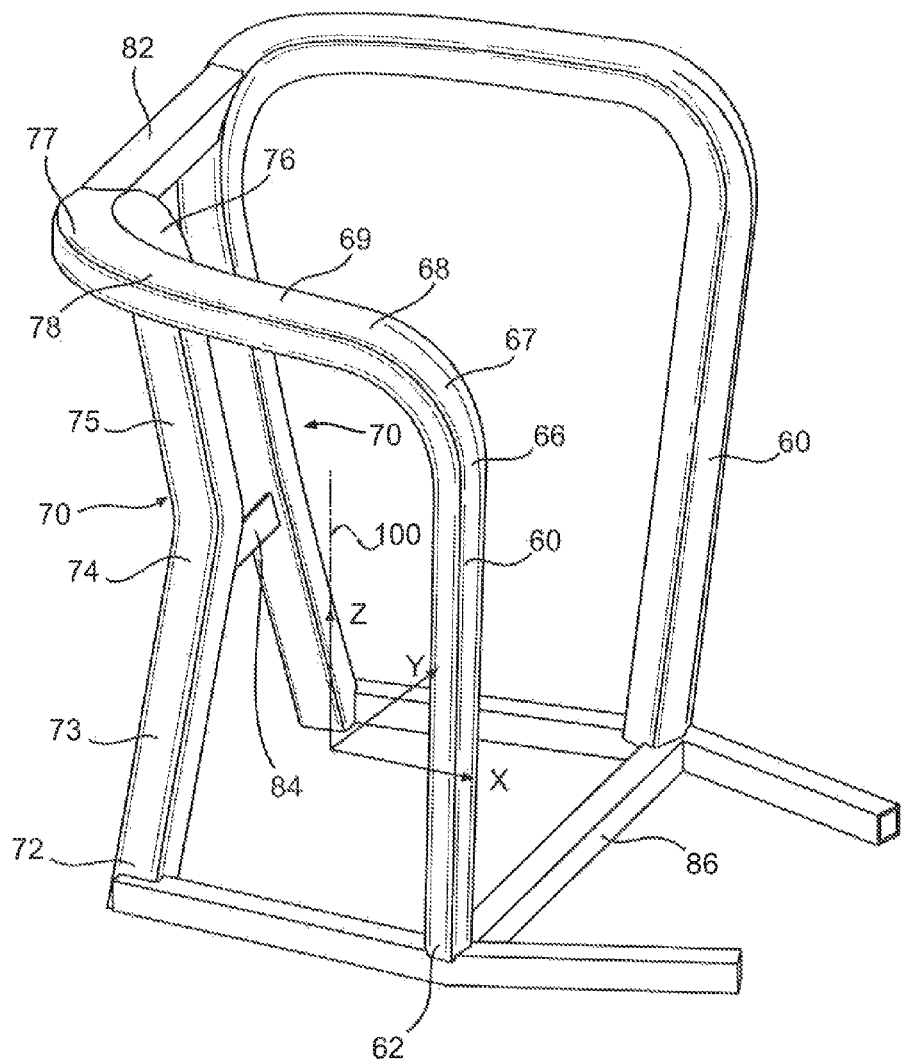
FIG. 4 is an isometric view of an exemplary ROPS that may be integrated in the frame of FIG. 3.
Figure 5:
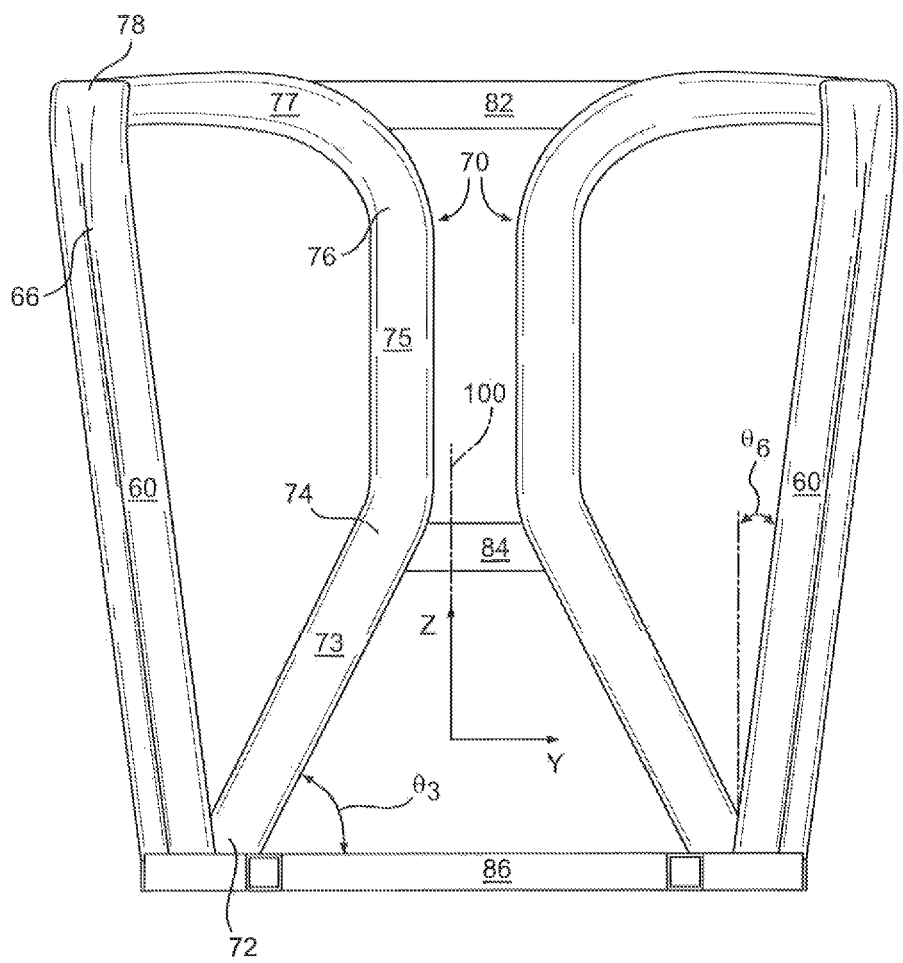
FIG. 5 is a front view of the ROPS of FIG. 4.
Figure 6:
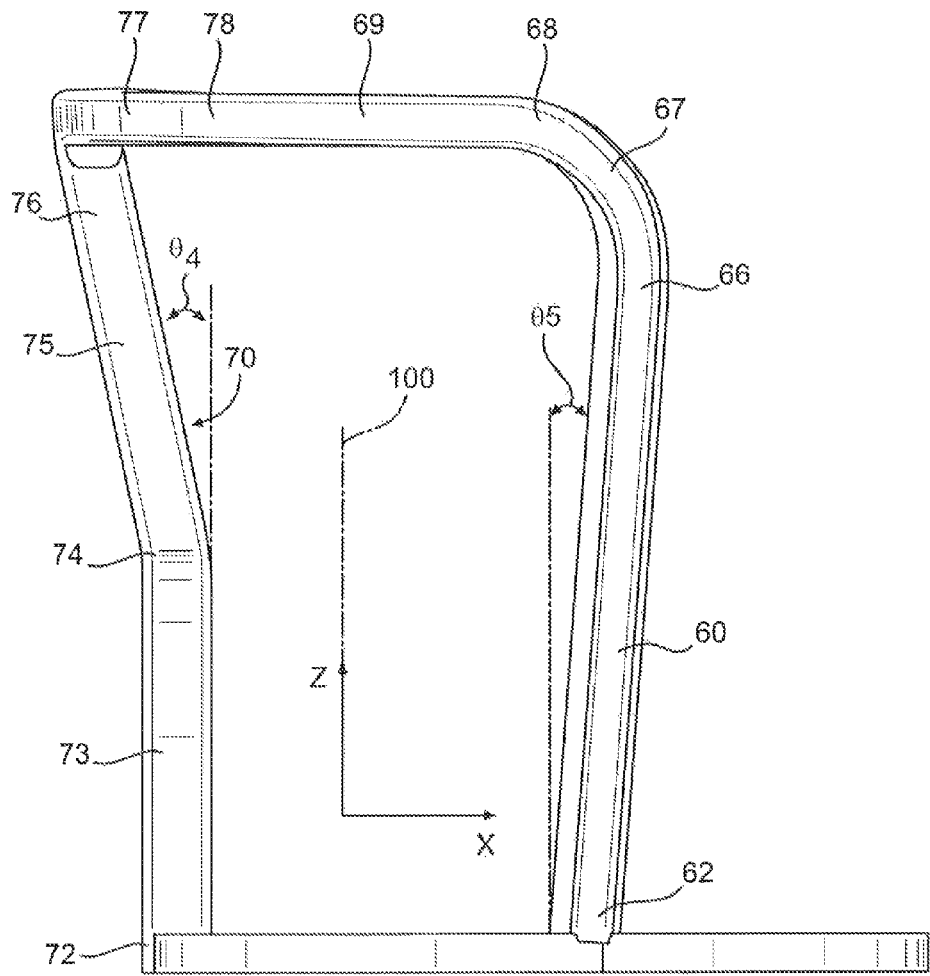
FIG. 6 is a side view of the ROPS of FIG. 4.

As explained earlier, two components, each comprising a B-post 60 and a C-post 70 connected together by a header 69 to form a single part, are attached together by cross members 82, 84, 86 to form the ROPS 30. Cross members 82 and 84 connect the C-posts 70 on either side of the cab 20 in a ladder configuration, and cross member 86 connects the seventh ends 62 of the B-posts 60 together. The cross members 82, 84, 86 minimize rotation of the cab 20 about the index axis 100, and thus provide torsional rigidity to the cab 20. Although FIG. 4 illustrates only three cross members 82, 84, 86, some embodiments of ROPS 30 may include more (or less) cross members. For instance, in some embodiments, in addition to cross members 82, 84 connecting the middle and top portions of the C-posts 70 together, another cross member may connect the bottom portion of the C-posts 70 together.

Figure 8:
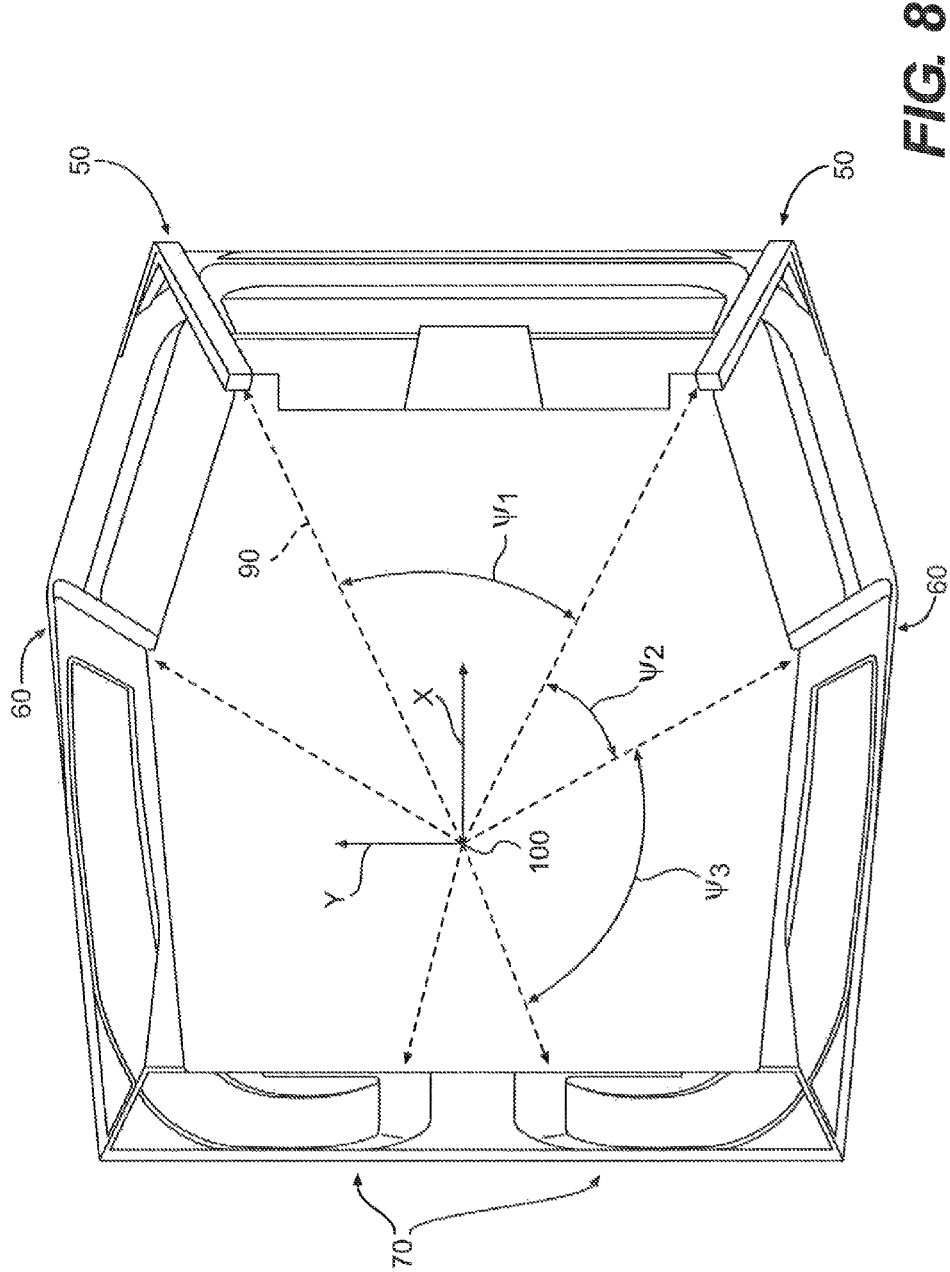
FIG. 8 is a schematic illustration showing an operator's field of view in the cab of FIG. 2.

The configuration and shape of the ROPS 30 described above increases operator visibility by decreasing obstructions to the operator's line of sight. FIG. 8 is a schematic illustration of the operator's line of sight 90 from cab 20. As described previously, the line of the sight 90 of the operator may generally be along straight lines that extend outwards from the index axis 100. The visibility of an operator will be described with reference to a viewing angle $\Psi$. The viewing angle $\Psi$ corresponds to the view of an operator between adjacent vertical support posts of the frame 28 of cab 20. The viewing angle is indicative of the range of unobstructed viewing available to the operator without moving in seat 22. As described previously, it is desirable for the operator to observe the location of a GET or a critical zone of the machine 10 (for example, relative positions of the blade heel and tires, see FIG. 1) without having to move in the cab 20 or stretch from the seat 22. If a support post obstructs the operator's view to a critical zone, the operator may have to move/stretch from the seat 22 to see around the obstruction. Such movements by the operator, while controlling the machine 10, increases operator fatigue and negatively affects operator efficiency. Therefore, in general, a large viewing angle in different directions improves operator efficiency and reduces operator fatigue.

The spacing between the A-posts 50 of frame 28 may be such that a viewing angle $\Psi_1$ through the windshield 46 may be between about 15°-90°. Since the A-posts 50 of frame 28 are inclined forwardly and outwardly, the viewing angle $\Psi_1$ increases from the floor 34 to the roof 32 of the cab 20. The spacing between the A-posts 50 and the B-posts 60 may provide a viewing angle $\Psi_2$ between about 20°-40°. Since the A-posts 50 and B-posts 60 are inclined forwardly and outwardly, viewing angle $\Psi_2$ also increases from the floor 34 to the roof 32. As can be seen in FIGS. 2 and 3, glass panes that are coupled to one another to form joints form the rear corners of cab 20. The configuration of C-posts leaves the rear corners of the cab 20 unobstructed by vertical posts, and provides a viewing angle $\Psi_3$ between about 60°-130°. In some embodiments, viewing angles $\Psi_1$, $\Psi_2$, and $\Psi_3$ may vary between about 30°-70°, 22°-38°, and 70°-120°, respectively. In some preferred embodiments, viewing angles $\Psi_1$, $\Psi_2$, and $\Psi_3$ may vary between about 40°-60°, 25°-35°, and 80°-110°, respectively. Since the rear corners of cab 20 are free of vertical posts, the operator's view to implements (such as, ripper 14 in FIG. 1) in the rear of machine 10, and the engine system 16 are unobstructed.

Figure 9:
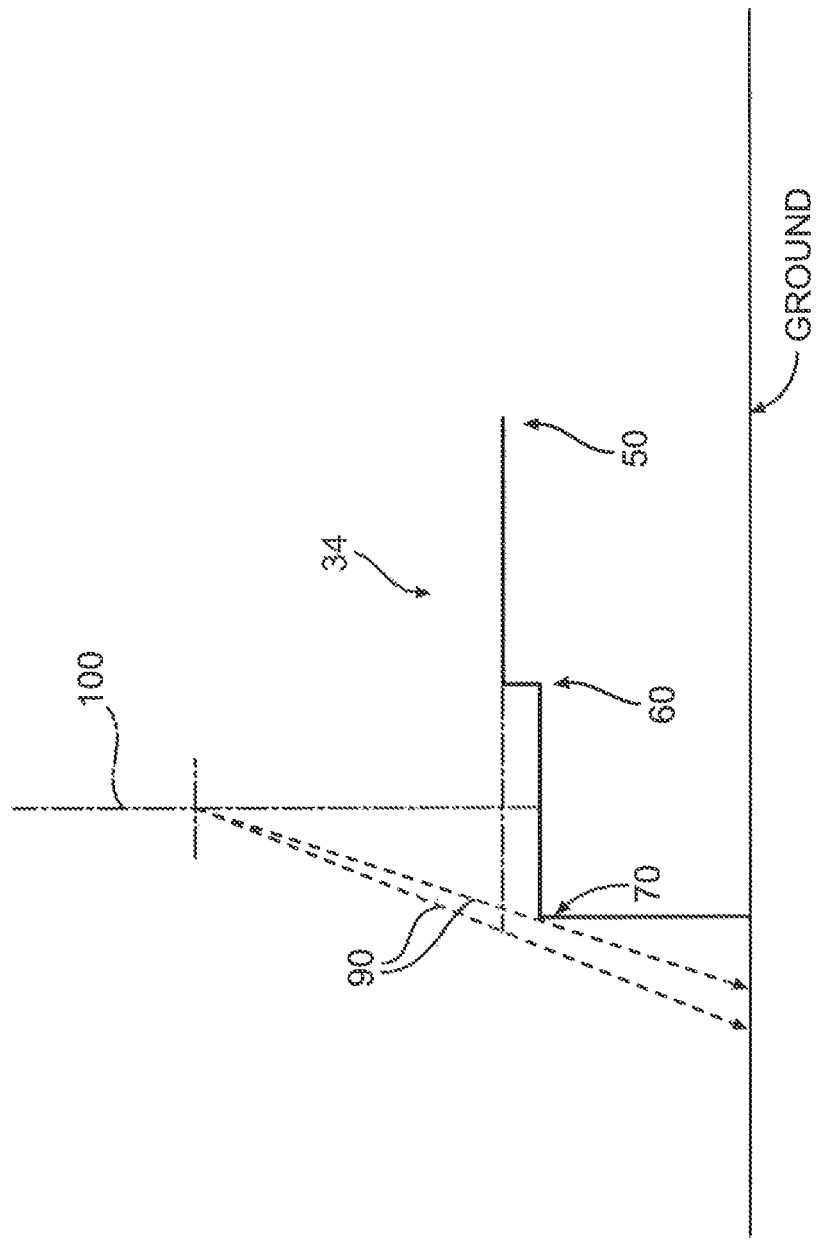
FIG. 9 is a schematic illustration showing an operator's field of view in a cab with a recessed floor.

In some embodiments, the region of the floor 34 between the B-post 60 and C-post 70 may be recessed to increase the operator's visibility to the ground close to the machine 10. As illustrated in FIG. 9, recessing the floor 34 between the B-post 60 and the C-post 70 enables the operator to see regions of the ground closer to the machine 10. This increases the visibility of the operator to the heel of the blade 12 and the tires 18. In some embodiments, the floor 34 between the B-post 60 and the C-post 70 may be recessed (or stepped) below the floor between the B-post 60 and the A-post 50 by between about 30-100 mm. In some embodiments, the recess may be between about 40-60 mm. Keeping the floor between the B-post 60 and the A-post 50 higher than the floor between the B-post 60 and the C-post 70 provides space for hydraulic and other systems of the machine 10 to be positioned below this region.

INDUSTRIAL APPLICABILITY

A cab for a mobile machine includes a frame with an integrated rollover protective structure (ROPS). Although the cab is described with reference to a motor grader, the current disclosure may be applied to the cab of any mobile machine to improve the operator's visibility out of the cab. The integrated ROPS of the cab frame may protect the cab in a rollover. The members of the ROPS and the frame are positioned to minimize obstruction to the operator's visibility while increasing the load carrying capacity of the ROPS.

Frame 28 of the cab 20 may include components positioned on the sides and extending along the length of the cab. In some embodiments, frame 28 includes components that are substantially symmetrically positioned about a vertical plane extending along the cab length (see x-z plane in FIG. 2). The frame 28 includes two A-posts 50 positioned at the front end of the cab 20, and a ROPS 30 integrated with the frame 28 behind the A-posts 50. In some embodiments, ROPS 30 may be a substantially symmetric structure that includes two C-posts 70 positioned at the rear ends of the cab 20 and two B-posts 60 positioned between the C-posts 70 and the A-posts 50. A C-post 70 and a B-post 60 of the ROPS 30 are formed as a single part without any joints using a hydroforming operation. The hydroforming operation is adapted to produce a single part comprising a C-post 70 connected to a B-post 60 through a header 69. The cross-sectional shapes and configurations at different locations of the part are adapted to minimize obstruction to the operator's visibility while increasing the load bearing capacity of the structure.

The C-post 70 is positioned at the rear corner of the cab 20 behind the operator's seat 22. The C-post 70 angles upwards from the floor 34 at a rear corner of the cab 20 towards the center of the cab 20. At the center of the cab 20, the C-post 70 extends upwards towards the roof 32 behind the operator's seat 22. The upper portion of the C-posts 70 curves outwards towards the top corner of the cab 20 to form a header 69 that extends towards the front of the cab 20. Repositioning the upper portions of the C-posts 70 closer to one another leaves the rear corners of the cab 20 free of vertical support members that may obstruct the operator's view towards the rear. The portion of the C-posts 70 that extends upwards behind the operator's seat 22 may be inclined away from the seat 22 to allow the back of the operator's seat 22 to be reclined. The upper portion of the C-posts may be curved in two orthogonal planes to gradually turn the upper end of the C-post 70 towards the header 69. The curvature of the upper portion of the C-post 70 may gradually change along its length to allow the ROPS 30 to absorb large loads without failure.

The upper portions of the C-post 70 and the header 69 may support the roof 32 along the edges of the cab 20. The header 69 may be curved outwards from the cab 20 to increase the strength of the ROPS 30 without additional support structures, and thereby reduce the weight of the ROPS 30. At its front end 69, the header 69 is coupled with the B-post 60 that extends downwards towards the floor 34. The B-post 60 is inclined forwards and outwards from the cab 20 to increase visibility and make the B-post 60 appear vertical to the operator in seat 22. The A-post 50 is positioned at the front corner of the cab 20. The A-post 50 may also be inclined forward and outward from the cab 20 to increase visibility and make the A-post 50 appear vertical to the operator. In some embodiments, the A-post 50 and the B-post 60 may have an elongated cross-sectional shape and these posts may be arranged with its long axis parallel to the operator's line of sight to minimize obstruction to the operator's field or view. In some embodiments, to increase the operator's visibility to the ground close to the machine 10, the floor 34 of the cab 20 between the B-post 60 and C-post 70 may be positioned below (or recessed) the floor 34 between the A-post 50 and B-post 60.

The A-post 50, B-post 60, and C-post 70 of the ROPS 30 are shaped and arranged to minimize obstruction to the operator's line of sight and reduce parts needed for the frame 28, while increasing the cab size and load carrying capacity of the ROPS 30. Increasing the operator's visibility and cab space reduces operator fatigue and thus improves productivity. Increasing the load carrying capacity of ROPS 30 increases safety in a rollover. Reducing the number of parts needed for the frame 28 reduces frame weight and manufacturing cost, and thereby improves machine efficiency and costs.

It will be apparent to those skilled in the art that various modifications and variations may be made to the cab frame for the mobile machine without departing from the scope of the disclosure. Other embodiments of the disclosed cab frame will be apparent to those skilled in the art from consideration of the specification and practice of the cab frame disclosed herein. It is intended that the specification and examples be considered as exemplary only, with a true scope of the disclosure being indicated by the following claims and their equivalents.

What is claimed is:

1. A cab of a mobile machine, comprising:
   a seat for an operator;
   a first vertical plane centrally located on the seat and extending along a length of the cab; and a rollover protective structure (ROPS), the ROPS including a first component and a second component positioned on either side of the first vertical plane, at least one of the first component and the second component including a single tube shaped to form a C-post positioned behind the seat, a B-post positioned in front of the seat, and a header connecting the C-post and the B-post, wherein:

the C-post and the B-post each include support structures that extend from a floor of the cab to a roof of the cab;

the support structure of the B-post includes an elongated portion that is inclined with respect to the first vertical plane and a second vertical plane orthogonal to the first vertical plane;

the support structure of the C-post includes a first portion that is inclined with respect to the first vertical plane and a second portion that is substantially parallel to the first vertical plane; and the header extends along a length of the cab.

2. The cab of claim 1, wherein the elongated portion makes an angle between about 5-15 degrees with the first vertical plane.

3. The cab of claim 1, wherein the elongated portion makes an angle between about 2-10 degrees with the second vertical plane.

4. The cab of claim 1, wherein a central portion of the C-posts of the first component and the second component extend towards each other.

5. The cab of claim 1, wherein the header is curved in a third horizontal plane orthogonal to the first vertical plane.

6. The cab of claim 1, wherein the second portion of the C-post is inclined away from the seat and makes an acute angle with the second vertical plane and the elongated portion of the B-post is inclined away from the seat and makes an acute angle with the second vertical plane.

7. The cab of claim 1, wherein the first component and the second component are symmetrically positioned on opposite sides of the cab and are connected together by one or more support members that extend along a width of the cab.

8. A method of forming a frame for a cab of a mobile machine, comprising:

providing a seat for an operator, wherein the seat includes a first vertical plane centrally located on the seat and extending along a length of the cab;

forming a first component and a second component by hydroforming, at least one of the first component and the second component including a C-post and a B-post formed as a single piece; and positioning the first component and second component on either side of the first vertical plane to form a rollover protective structure (ROPS), the first component and the second component being positioned such that the C-post is located behind the seat and the B-post located in front of the seat, wherein the C-post and the B-post both include support structures that extend from a floor of the cab to a roof of the cab, the B-post is arranged such that an elongated portion of the support structure of the B-post is inclined with respect to the first vertical plane and a second vertical plane orthogonal to the first vertical plane, and the support structure of the C-post includes a first portion that is inclined with respect to the first vertical plane and a second portion that is substantially parallel to the first vertical plane.

9. The method of claim 8, wherein arranging the B-post includes positioning the elongated portion to make an angle between about 5-15 degrees with the first vertical plane.

10. The method of claim 8, wherein arranging the B-post includes positioning the elongated portion to make an angle between about 2-10 degrees with the second vertical plane.

11. The method of claim 8, wherein positioning the first component and second component includes symmetrically arranging the first component and the second component on opposite sides of the cab.

12. The method of claim 8, wherein forming a first component and a second component includes forming the C-post and the B-post that are connected together by a curved header as a single part, and positioning the first component and second component include positioning the header to extend along a length of the cab and curve in a third horizontal plane orthogonal to the first vertical plane.

13. A cab for a mobile machine, comprising a first vertical plane extending along a length of the cab, a second vertical plane orthogonal to the first vertical plane and extending along a width of the cab, and a third horizontal plane orthogonal to the first and second vertical planes; and a rollover protective structure (ROPS) including a first component extending along the length of the cab and positioned at a side of the cab and a second component extending along the length of the cab and positioned at an opposite side of the cab, wherein at least one of the first component and the second component includes a single tube shaped to form a C-post positioned at a rear portion of the cab and a B-post positioned at a mid-portion of the cab, wherein the C-post and the B-post both include support structures that extend from a floor of the cab to a roof of the cab, the support structure of the B-post includes an elongate member that is inclined with respect to the first and second vertical planes, and the support structure of the C-post includes a first portion that is inclined with respect to the first vertical plane and a second portion that is substantially parallel to the first vertical plane.

14. The cab of claim 13, wherein the second portion of the C-post is inclined with respect to the second vertical plane.

15. The cab of claim 13, wherein the at least one of the first component and the second component includes a single tube shaped to form the C-post connected to the B-post by a curved header, the header being curved in the third horizontal plane.

16. The cab of claim 13, wherein the elongate member of the B-post makes an angle between about 5-15 degrees from the first vertical plane and angle between about 2-10 degrees from the second vertical plane.

* * * * *

UNITED STATES PATENT AND TRADEMARK OFFICE
CERTIFICATE OF CORRECTION

PATENT NO. : 8,926,003 B2
APPLICATION NO. : 13/761777
DATED : January 6, 2015
INVENTOR(S) : Gielda et al.

Page 1 of 1

It is certified that error appears in the above-identified patent and that said Letters Patent is hereby corrected as shown below:

Title Page, Column 2, References Cited (Other Publications), line 2, delete "Portective" and insert -- Protective --.

In the claims

Column 12, line 24, in Claim 13, delete "comprising" and insert -- comprising: --.

Signed and Sealed this
Seventeenth Day of November, 2015

Michelle K. Lee
*Director of the United States Patent and Trademark Office*